Figure 1:
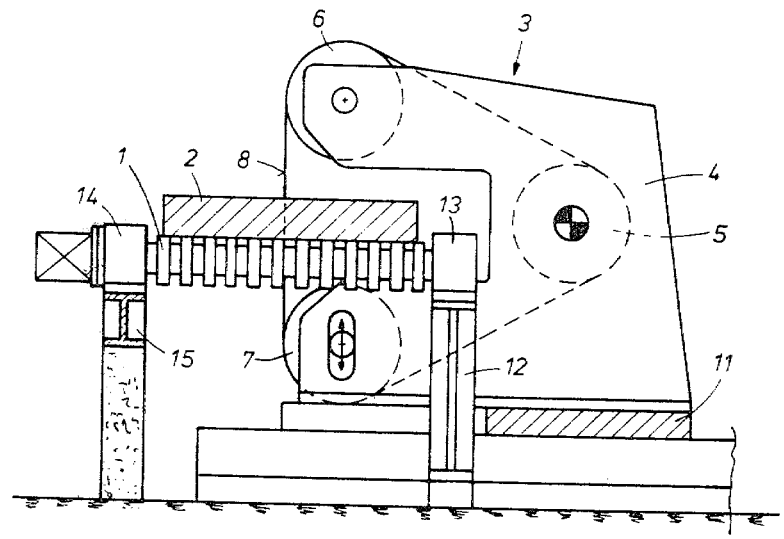

United States Patent [19]

Sack

[11] 4,333,370
[45] Jun. 8, 1982

[54] METHOD AND PLANT FOR SLITTING A HOT SLAB EMERGING FROM A CONTINUOUS CASTING PLANT

[75] Inventor: Ernst Th. Sack, Ratingen, Fed. Rep. of Germany

[73] Assignee: Sack GmbH, Düsseldorf, Fed. Rep. of Germany

[21] Appl. No.: 166,452

[22] Filed: Jul. 7, 1980

[30] Foreign Application Priority Data

Jun. 11, 1980 [DE] Fed. Rep. of Germany ....... 2927944

[51] Int. Cl.³ .......................................... B22D 11/126
[52] U.S. Cl. ........................................ 83/56; 83/102.1; 83/407; 83/425.1; 83/808
[58] Field of Search ................ 83/425, 425.2, 433, 83/435, 788, 789, 802–820, 407, 425.1, 56

[56] References Cited

U.S. PATENT DOCUMENTS

| | | | |
|---|---|---|---|
| 336,407 | 2/1886 | Hanks et al. | 83/788 X |
| 2,307,190 | 1/1943 | Bell | 83/817 |
| 3,059,516 | 10/1962 | Cleland et al. | 83/820 X |
| 3,318,347 | 5/1967 | Alich | 83/806 X |
| 3,474,693 | 10/1969 | Wilkie et al. | 83/820 X |
| 3,552,455 | 1/1971 | Pinat | 83/804 |
| 3,903,771 | 9/1975 | Fritz | 83/425.2 X |
| 4,074,601 | 2/1978 | Warren | 83/425.2 |

FOREIGN PATENT DOCUMENTS 1288610 2/1962 France .................................. 83/788

Primary Examiner—James M. Meister
Attorney, Agent, or Firm—John J. Dennemeyer

[57] ABSTRACT

A plant for slitting a hot slab, emerging from a continuous casting machine, by means of band sawing machines of which two or more are guided in the serial direction of the slab and are slidably guided transversely to the slab feed direction so that saw changing can be performed in a position outside the rollers of the roller table. Normally, all band sawing machines are in the operating position so that a second, third and so on band sawing machine continues the slitting cut if the saw blade of the preceding machine breaks. The band sawing machines are conveniently provided with one-sided, C-frames, each of which has at least three cantilevered guide rollers for the saw blade, of which one roller is driven.

12 Claims, 3 Drawing Figures

METHOD AND PLANT FOR SLITTING A HOT SLAB EMERGING FROM A CONTINUOUS CASTING PLANT

The invention relates to a plant for slitting a hot slab which emerges from a continuous casting plant and is delivered on a roller table. Flame cutting equipment was used exclusively hitherto (German Auslegeschrift 27 10 564) for slitting continuously cast slabs although the disadvantages of flame cutting compared with sawing are obvious. It is known that these disadvantages were due to the fact that the relatively broad flame cut involves losses of material and leads to the formation on the underside of the slabs of so-called flame of slag flash which must be removed before the slabs are rolled.

The hot iron carriage saw, adapted to operate with a circular saw and conventionally used for subdividing a hot rolled stock is a first choice if sawing techniques are to be employed to avoid the above-mentioned disadvantages. However, since it would be necessary to provide circular saws of very large diameter when such a hot saw is to be employed for slitting continuously cast slabs in order to keep the bearings for the circular saw at a sufficient distance from the heat radiating slab surface which imposes high thermal stresses, the saw blade became so thick for reasons of stability that the loss of material would be approximately the same as that resulting from flame cutting. Furthermore, a superstructure of portal configuration would be necessary in the roller table region to accommodate a hot saw for slitting hot slabs and the horizontal support structure of such a device would have to cut in the middle. The plant would be excessively expensive, especially if more than one hot saw were to be provided for reasons of safety, since long periods of uninterrupted casting can be obtained at the present time by adopting the sequence casting principle in continuous casting plants.

To solve the problem of slitting continuously cast slabs by sawing, in order to avoid flame cutting, the invention proposes that cutting be performed by sawing with a circulating band saw in a system in which the slitting plant comprises two or more band sawing machines arranged serially in the feed direction of the slab, each having a one-sided C frame which supports at least three band saw guide rollers in cantilevered configuration, of which one roller is driven and the frames bear on guides that extend transversely to the slab feed direction and are sufficiently long to ensure that the band sawing machines can be slid to a place outside the roller table for the purpose of changing the saws. The one-sided construction of the frames combined with the provision of at least three guide rollers for the band saw permits adjustment of the vertically extending stringer of the band saw to the centre of even the broadest slabs. By selecting a suitable material for the metal band saw it is possible to operate with a high cutting speed, because by contrast to a hot saw using a circular saw blade, the cutting speed of a band saw has no effect on a minimum saw blade thickness which may be required in the interests of stability. The high cutting speed also reduces thermal stresses imposed on the band saw which can also be effectively cooled in the course of its circulation. The multiple arrangement of a plurality of band sawing machines in serial configuration, all of which are adjusted in flush alignment with the same cutting line at the beginning of a continuous casting sequence, ensures that in the event of breakage of the saw band of the leading band sawing machine the succeeding band sawing machine can immediately come into operation and so on. Since the band sawing machines are in any case driven into a flush-aligned position for the casting operation, it is advisable that a common baseplate be provided for all frames of the band sawing machines so that it is not necessary for each frame to be provided with its own traversing drive.

If a saw band breaks, one end of the saw band frequently remains in the material because breakage causes instant failure of the frictional drive of the saw band. To enable such end of a retained saw band to be removed, the invention proposes that the saw bands are provided with identical teeth on both edges and each band sawing machine is driven in the direction which is the reverse of that of the immediately preceding band sawing machine. This ensures that two oppositely oriented tooth systems engage with each other and the succeeding saw band pulls out the retained saw end from the cutting joint of the slab, when a retained saw band end approaches the region of the next saw band together with the continuously advanced slab.

Figure 3:
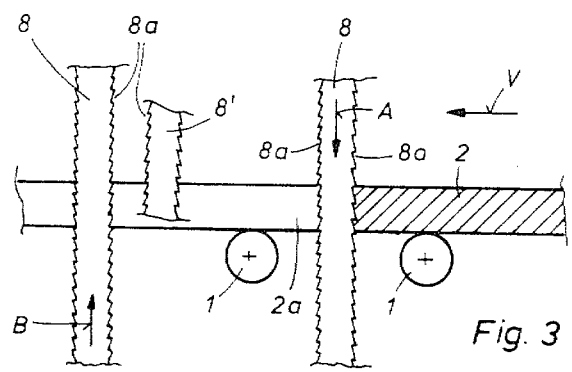
Figure 2:
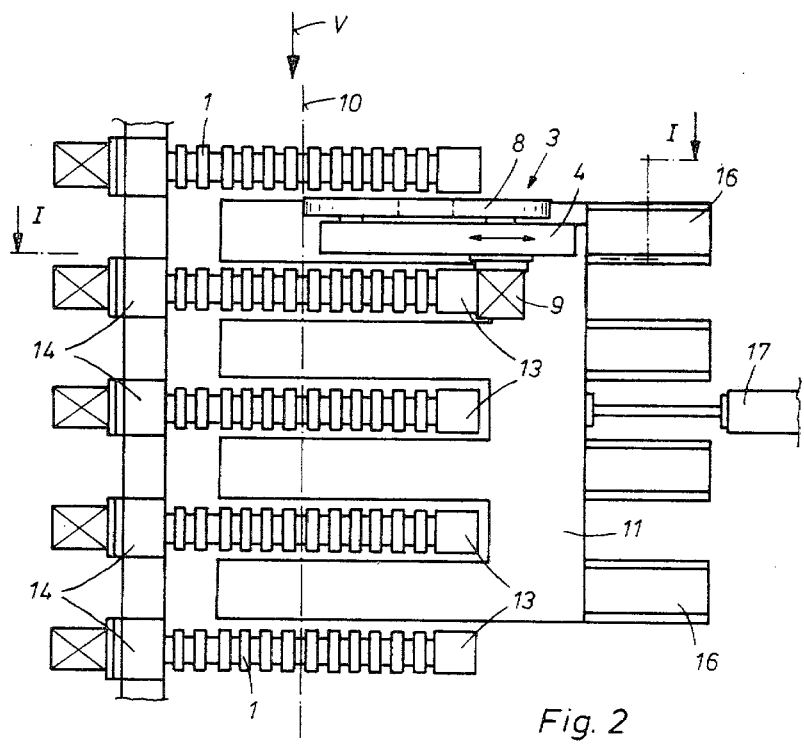

One embodiment of a system for slitting continuously cast slabs in the course of sequence casting is illustrated in the accompanying drawing in which:

FIG. 1 shows a band sawing machine in the cutting position and as a view in section along the line I—I of FIG. 2, FIG. 2 is a plan view of the plant and FIG. 3 is an enlarged view of one detail.

A hot continuously cast slab passes on to a roller table equipped with cogged rollers 1 either before or after cross cutting and moves into the region of the splitting plant which, in the exemplified embodiment comprises four band sawing machines 3 which are arranged serially in the feed direction of the slab. Each band sawing machine comprises a one-sided C frame 4 on which three guide rollers 5, 6 and 7 are supported in cantilevered configuration to guide the saw band 8. The roller 5 is driven by a flanged motor 9. The roller 7, disposed beneath the roller 6, is constructed as a tensioning roller and is vertically adjustable to enable the saw band 8 to be placed on to the cantilevered guide rollers.

Only one of the four band sawing machines 3 is shown in the plan view according to FIG. 2 namely the band sawing machine which leads in the feed direction V of the slab, not shown, and the perpendicularly extending stringer of the saw band 8 is adjusted to the cutting line 10 for the purpose of slitting a continuously cast slab. A common baseplate 11 for all band sawing machines can be recognized in FIG. 2, since the remaining three successive band sawing machines are not shown in this Figure. The said baseplate 11 is embodied in tine shaped configuration, namely in the interests of the perpendicularly extending individual supports 12 for the bearings 13 of the roller table rollers 1 in the region of the slitting plant (FIG. 1). The bearings 14 of the roller table rollers on the other side of the roller table can be supported in known manner by a continuous bottom flange 15.

The common baseplate 11 for all band sawing machines 3 which come into operation between successive roller table rollers 1, bears on four guide beds 16, extending transversely to the slab feed direction V, and can be slidably adjusted by means of a hydraulic control drive 17 between the operative position illustrated in FIG. 2 and a retracted position in which all band sawing machines 3 are situated outside the roller table region.

In this position the saw bands 8 can be exchanged if continuous casting operation is interrupted.

FIG. 3 shows a section through the cutting joint of a slab 2 with a saw band blade 8 associated with the band sawing machine 3, which leads in the feed direction V of the slab, situated in the cut.

What is claimed is:

1. A method for slitting a hot slab emerging from a continuous casting plant advancing on a roller table comprising the steps of:
   (a) providing a plurality of band saw means, each having a saw blade;
   (b) serially positioning said blade of each of said band saw means one behind the next in a single cutting path, the first blade in the direction of said emerging slab being the leading blade, and the blades positioned therebehind being succeeding blades;
   (c) advancing the emerging slab;
   (d) cutting the advancing slab with the leading blade of the serially positioned blades;
   (e) providing means on each blade for removing said leading blade in the series when said leading blade breaks;
   (f) continuing to advance the slab when said leading blade breaks; and
   (g) cutting said advancing slab with said succeeding saw blade.

2. The method as described in claim 1, wherein said band saw means comprises:
   (a) a substantially C-shaped frame; and
   (b) at least three saw blade guide rollers supported by said frame in cantilevered configuration, one of said rollers rotated by driving means, said rollers carrying said saw blade.

3. The method of claim 2 further comprising the steps of:
   (a) providing guideways extending transversely to the direction in which the slab advances;
   (b) slidably mounting said band saw frame on said guideways, said guideways being of a length sufficient to slide said band saw means thereon to a position adjacent to said roller table; and
   (c) positioning said frames on said guideways whereby said blades are serially positioned one behind the next in a single cutting path.

4. The method of claim 2 or 3 further comprising:
   (a) mounting said frames on a common base plate;
   (b) slidably mounting said common base plate on said guideways; and
   (c) positioning said base plate whereby said blades carried by said frames are serially positioned one behind the next in a single cutting path.

5. The method of claim 1 including:
   (a) providing said blades with tooth means on both sides thereof,
   (b) impacting said leading blade jammed in the slab with said tooth means of said succeeding blade, said tooth means of said succeeding blade being oppositely oriented to said tooth means of said jammed leading blade.

6. The method of claim 5, wherein said tooth means on both sides of said blades are identical, and said leading blade is driven in a rotation opposite to the rotation of said succeeding blade.

7. An apparatus for cutting a hot slab emerging in a longitudinal direction from a continuous casting plant advancing on a rolling table comprising:
   (a) a plurality of band saw means each having a blade;
   (b) each blade being positioned serially one behind the next in a single cutting path in the longitudinal direction of the advancing slab, the first blade in the direction of the emerging slab being the leading blade and the blades positioned therebehind being succeeding blades; and
   (c) means on each succeeding blade for removing said leading blade when said leading breaks.

8. The apparatus described in claim 7, wherein said band saw means further comprises:
   (a) a substantially C-shaped frame;
   (b) at least three blade guide rollers supported by said frame in a cantilevered configuration; and
   (c) drive means rotating one of said rollers, said rollers carrying one of said blades thereon.

9. The apparatus of claim 8 further comprising:
   (a) guideways extending transversely to the longitudinal direction of the emerging slab;
   (b) said frames being slidably mounted on said guideways, said guideways having sufficient length to slide said band saw means thereon to a position adjacent to said roller table.

10. The apparatus of claim 8 or 9 further comprising:
    (a) a common base plate, each of said frames being mounted thereon, said common base plate being slidably mounted on said guideways.

11. The apparatus of claim 7, wherein said removing means include tooth means on both sides of each of said blades, said tooth means on said leading blade on the side thereof facing the succeeding blade, being oriented opposite to said tooth means on the side thereof facing said leading blade, when said succeeding blade is rotated.

12. The apparatus of claim 7, wherein said blades have identically oriented tooth means on both sides thereof and said leading blade is rotated in a direction opposite to the rotation of said succeeding blade.

* * * * *